April 15, 1958    V. E. RIMSHA ET AL    2,830,743
THREE WAY VALVE ASSEMBLY
Filed March 5, 1956
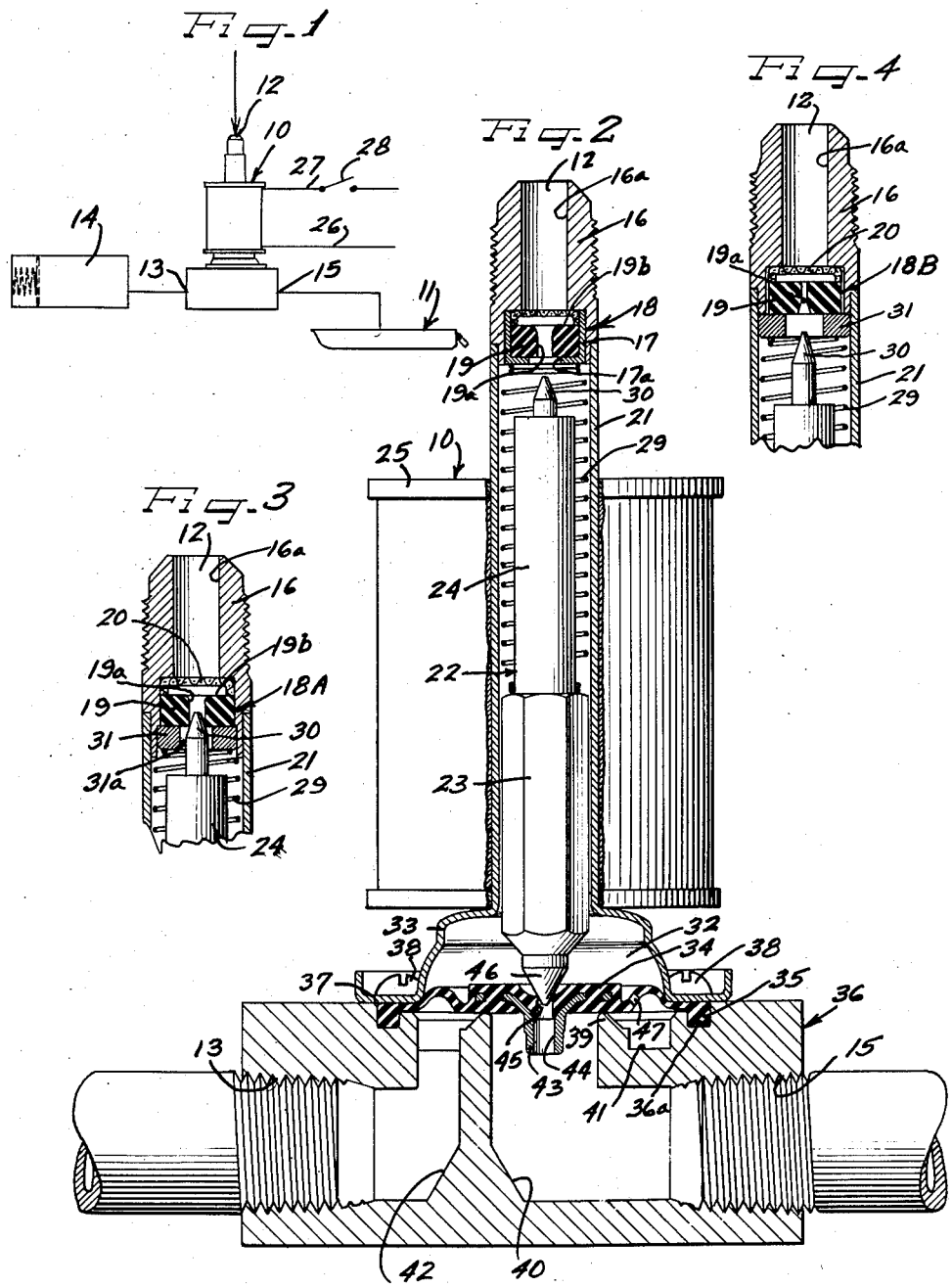
Inventors
VICTOR E. RIMSHA
ROBERT R. DAHL United States Patent Office 2,830,743
Patented Apr. 15, 1958

2,830,743

THREE WAY VALVE ASSEMBLY

Victor E. Rimsha and Robert R. Dahl, Chicago, Ill., assignors to The Dole Valve Company, Chicago, Ill., a corporation of Illinois Application March 5, 1956, Serial No. 569,585

10 Claims. (Cl. 222—335)

This invention relates to improvements in fluid control devices, and more particularly to a flow control device capable of quickly discharging a measured amount of fluid to a container or receptacle.

More particularly, the present invention deals with a three way valve assembly to be associated with an ice cube maker in a refrigerator, wherein the assembly is connected to a tap water source and cyclically supplies a fast discharge of a measured amount of water to the forming trays of the ice cube maker. However, other uses and purposes of this three way valve assembly may be apparent to one skilled in the art.

In the present invention, water enters the assembly through an inlet and passes through a combination flow control and shut-off valve, the flow control portion being constructed to provide an extremely low rate of flow. The water then passes through a tubular member and around a solenoid-actuated plunger to a chamber, one wall of which is defined by a flexible diaphragm of a pilot-operated diaphragm valve. A bleed hole in the diaphragm allows the water to enter what would normally be the inlet port to the valve and flow directly into a spring loaded accumulator or storage chamber. An annular valve seat leading to the outlet of the assembly which is connected to the ice cube maker tray coacts with the diaphragm to control the fluid flow from the accumulator to the outlet. The diaphragm is also provided with a pilot opening larger than the bleed hole for seating a conical projection at one end of the plunger, this opening when open permitting the pressure within the chamber on the inlet side of the bleed hole to diminish to a point less than the pressure on the outlet side of the bleed hole to cause movement of the diaphragm for unseating it from the annular valve leading to the outlet. This places the accumulator in direct communication with the outlet and permits a fast dumping or discharging of the water within the accumulator to the outlet for subsequent filling of an ice cube tray or the like. The other end of the plunger also carries a conical projection for coacting with the shut-off portion of the combination valve and preventing additional water from entering the assembly during the unloading of the accumulator.

Accordingly, it is an object of this invention to provide an improved flow control device that gives a fast discharge of a measured amount of fluid.

Another object of this invention resides in the provision of a three-way valve assembly for use in connection with ice cube makers having an extremely low rate flow control valve at the inlet in conjunction with a pilot-operated diaphragm valve at the outlet.

A further object of this invention is in the provision of a valve assembly connected to a pressurized water supply for delivering a measured amount of water to a container and having a combination low rate flow control and shut-off valve, a pilot-operated diaphragm valve, an accumulator or storage chamber and a solenoid operated plunger for selectively controlling fluid flow through the fluid control valve and the diaphragm valve.

A still further object of this invention is to provide a fluid control device for use in association with ice cube makers and refrigerators which combines the use of an extremely low rate flow control valve in the inlet in conjunction with a pilot-operated diaphragm valve that enables the size of the device to be minimized for gaining efficient low-cost operation.

Another object of this invention is in the provision of a valve assembly that may be connected to a pressurized water supply source for delivering a measured quantity of water to a receptacle such as an ice cube maker having a combination very low rate flow control and shut-off valve at the inlet in association with a pilot-operated diaphragm valve, wherein the flow control portion is of the elastic-orificed disk type and the outlet end of the orifice defines the shut-off portion for receiving a cone shaped end of a solenoid operated plunger, and wherein the elastic disk would absorb any vibrations which might be generated through the energization of the solenoid actuating the plunger.

Other objects, features, and advantages of the invention will be apparent from the following detailed description of the accompanying sheet of drawing, wherein like reference numerals refer to like parts in which:

On the drawings:

Figure 1 is a diagrammatic view of a fluid control system embodying the invention;

Figure 2 is an enlarged partially fragmentary view, with parts in section and other parts broken away to show underlying parts, of a three-way valve assembly constructed in accordance with the principles of the invention;

Figure 3 is an enlarged fragmentary view in section, with some parts in elevation, of a modified form of the invention, and Figure 4 is an enlarged fragmentary view in section with some parts in elevation and illustrating still a different form of the invention.

As shown on the drawings:

In Figure 1, the three-way valve assembly of the present invention is generally designated by the numeral 10 and illustrated diagrammatically in association with an automatic ice cube maker 11 of a refrigerator, which is merely illustrated herein as an ice cube tray. Water is introduced into the valve assembly 10 through an inlet 12 that is connected to a pressurized water supply, such as the tap water supply in a building, passed through an inlet-outlet port 13 to a spring loaded accumulator or storage chamber 14, and then dumped or discharged back through the inlet-outlet port 13 and out of a discharge port 15 to the ice cube maker 11. The accumulator 14 assures that a measured amount of water is discharged to the ice cube maker 11.

Referring now to Figure 2, the inlet 12 includes an externally threaded cylindrical fitting 16 having an axial bore 16a, the bore having a diametrically enlarged portion at its inner end to receive in press fit relationship a cup-shaped seat member 17 of a flow control valve 18 which is at the outermost end of the diametrically enlarged bore portion, and is centrally apertured at 17a. Seated within the cup shaped member 17 and against the bottom thereof is an elastic or flexible disk 19 having an axial orifice 19a therein of smaller size than the aperture 17a in the bottom of cup-shaped seat 17 to provide an inwardly projecting portion beyond the peripheral edge of the aperture. The elastic disk 19 may be constructed of any suitable elastic material, such as rubber, synthetic rubber or the like. The height of the disk 19 is less than the inside height of the seat 17 thereby providing a space for receiving an inverted cup-shaped filter 20 of sintered metal or fine mesh screen for initially filtering the incoming water. Due to the possible high pressures exerted on the valve 18 by the incoming water, the cup-shaped seat is silver soldered within the enlarged portion of the bore 16a, as well as being pressed fitted therein.

The valve 18 is particularly constructed to provide a constant low rate of flow. When water is passed through the valve the pressure of the water upon the upper face 19b of the disk 19 causes the elastic material around the orifice 19a to be distorted, a portion of it being forced downwardly into the aperture 17a of the seat 17. This distortion of the disk 19 causes the inlet end of the orifice 19a to be reduced in size or cross sectional area according to the pressure of the water on the upper surface 19b. Thus, the effective opening of the orifice 19a is automatically varied by the fluid pressure delivered to the valve so as to maintain a constant rate of flow irrespective of the pressure of the water delivered thereto. After the water passes through the valve 17, it enters a tubular guide member 21 of cylindrical shape that is suitably secured at one end to the inlet fitting 16 in telescopic fashion, such as by press fitting and silver soldering.

Slidably guided within the tubular member 21 is a plunger 22. The plunger 22 includes a lower polygonally shaped magnetically responsive section 23 of material having a relatively high permeability and low coercive force, and an upper cylindrical section 24 of brass. Preferably, the lower section 23 may be formed from a type 430 semi-stainless steel having 18% chromium, but no nickel. The magnetically responsive section 23 of the plunger also serves as an armature of a solenoid that includes a coil 25 encircling the plunger and guide member. Electrical leads 26 and 27 connect the solenoid to a power source and in association with a cycling circuit of an ice making mechanism, wherein a switch 28 is connected in one of the leads, as seen in Figure 1. The plunger 22 is normally biased to the position shown in Fig. 2 by a spring 29 encircling the cylindrical portion 24 of the plunger, the spring being bottomed at one end on the ridge formed between the two sections of the plunger and at the other end on the valve seat 17.

As already explained, the outlet end of the orifice 19a in the flexible disk 19 serves as a shut-off seat and coacts with a projection having a conical valve face 30 at the upper end of the plunger 22, wherein a shut off valve is defined by these elements and may be actuated upon energization of the coil 25.

An alternative form of a combination automatic flow control and shut-off valve is illustrated in Fig. 3 and designated generally by the numeral 18a. In this embodiment, the filter 20 is received in inverted position within the enlarged end of the bore 16a and abuts against the annular shoulder formed between the main bore 16a and the enlarged portion thereof. Shouldered against the outside end of the filter 20 is the elastic disk 19 which is sized to be snugly received within the enlarged end of the bore 16a. To retain the elastic disk in position, a rigid disk 31, having an axial opening 31a therein larger than the orifice 19a in the elastic disk 19 shoulders against a bottom end of the elastic disk and is received in press fit and silver soldered relationship within still a further enlarged portion of the bore 16a.

A still different arrangement of a combination automatic flow control and shut-off valve is illustrated in Fig. 4 and generally designated by the numeral 18B, this embodiment differing from that shown in Figure 3 only in that the annular disk retaining member 31 is sized to be received in press fit and silver soldered relationship within the inner wall of the tubular guide member 21 outside the end of the inlet fitting 16. One other difference lies in the construction of the elastic disk 19 in that the outlet end of the orifice 19a is slightly flared to complementally coact with the conically shaped valve face 30 at the upper end of the plunger 22.

Referring again to Figure 2, from the valve 17, the water passes downwardly through the tubular guide member around the plunger 22 and into a fluid chamber 32 defined by a substantially bell-shaped cap 33 integral with the bottom end of the tubular guide member 21 and a diaphragm 34 extending across the open end of the cap and comprising the main part of a pilot-operated diaphragm valve.

For the most part, the diaphragm 34 is constructed of resilient material such as a rubber-like material or a synthetic plastic material and includes a marginal bead 35 seated in an annular slot 36a of a housing 36. The cap 33 is annularly flanged at 37 and secured to the housing 36 in overlying relationship to the diaphragm marginal bead 35 by suitable securing means 38.

The diaphragm 34 extends over an annular valve seat 39 which leads to the discharge port 15 through an angular passageway 40 in the housing. Concentric to the seat 39 is a channel-shaped groove 41 defining with the diaphragm 34 an annular passageway which communicates with the accumulator inlet-outlet port 13 through an angular passageway 42. The diaphragm 34 is centrally provided with a brass insert 43 integrally molded with the flexible material of the diaphragm and formed in cross section as illustrated in Figure 2. The brass insert is provided with an orifice 44 in coalignment with a central pilot opening 45 which seats a conical valve face 46 projecting from the lower end of the plunger 22. A bleed hole 47, smaller in cross-section than the pilot opening 45, is provided in the diaphragm 34 which allows the incoming water to pass from the chamber 32 to the accumulator through the annular passageway below the diaphragm, the angular passageway 42, and the inlet-outlet 13. This bleed hole further serves to equalize the pressure on both sides of the diaphragm when the plunger valve seat 46 covers the pilot opening or orifice 45.

Inasmuch as the surface area exposed to the fluid pressure on the top side of the diaphragm or the side contiguous to the conical valve face 46 exceeds the surface area exposed thereto on the underside thereof within the annular passageway, the diaphragm 34 is pressed inwardly against the annular seat 39, and no fluid flow occurs from the annular passageway to the passageway 40, or from the accumulator to the discharge port 15. However, upon energization of the coil 25 of the solenoid, the plunger 22 moves within the guide member 21 against the force of the spring 29 to substantially simultaneously lift the conical valve face 46 from the pilot opening 45 and seat the upper conical valve face 30 in the shut-off seat at the outlet end of the orifice 19a in the disk 19.

In operation, when the solenoid is deenergized to allow the plunger 22 to take the position as shown in Fig. 2, water enters the inlet 12 and is passed through the filter 20 to the combination flow control and shut-off valve 18. The valve 18 provides a constant low rate flow. As the water enters the pressure chamber 32 above the pilot-operated diaphragm 34, the water will be taken away through the bleed hole 47 and to the accumulator 14 without causing an undue pressure to be generated on the top of the diaphragm 34. As soon as the storage chamber or accumulator is full, the flow stops, since there is no other place for the water to flow. Preferably, the accumulator cylinder will be provided with a stop means which would operate to assure that water quantities delivered thereto will not vary with the supply pressure. Under these conditions, the diaphragm valve remains in a steady-state condition until the coil 25 is energized. When the coil is energized, the conical valve face 46 on the plunger 22 lifts out of the diaphragm pilot opening 45 and the upper conical valve face 30 closes off the water inlet when contacting the shut-off valve seat at the outlet end of the disk orifice 19a. With the pilot hole open in the diaphragm 34, this opening being larger than the bleed hole 47, the pressure in the upper chamber 32 is diminished to a point lower than the pressure at the underside of the diaphragm 34 and causes upward movement of the diaphragm away from the valve seat 39, thereby permitting fluid flow from the accumulator 14 to the discharge port 15 of the assembly since the annular groove 41 is now in communication with the passage 40 downstream from the valve seat 39. A fast discharge or dumping of the accumulator is then achieved for filling an ice cube maker container or the like.

While the plunger 22 is in contact with the flow control disk 19 due to the latter being of elastic material, any noise will be eliminated that might emanate from vibrations set up in the energized electric coil 25 due to this metal-rubber contact. Any slight leakage that may exist along the valve face would have no effect on the overall operation of the device.

It will be understood that modifications and variations may be effected without departing from the scope of the novel concepts of the present invention, but it is understood that this application is to be limited only by the scope of the appended claims.

We claim as our invention:

1. A fluid control device having an inlet and an outlet, an automatic flow control valve at the inlet providing a substantially constant low rate of flow into said device, a diaphragm valve at the outlet, a solenoid operated plunger controlling the opening and closing of said valves normally positioned to close the diaphragm valve and open the control valve, and a storage chamber for receiving the incoming fluid through the control valve and for discharging the fluid under pressure through said diaphragm valve upon actuation of said plunger.

2. A fluid control device having an inlet and an outlet, a combination flow control and shut-off valve at the inlet, a diaphragm valve at the outlet having a pilot opening, a solenoid operated plunger having means for coacting with said combination valve and means for coacting with said diaphragm valve for opening and closing said corresponding valves, and an accumulator receiving the incoming fluid and quickly discharging the fluid under pressure upon actuation of said plunger.

3. A fluid control device adapted to be connected to a pressurized fluid source and deliver a measured quantity of fluid which comprises an inlet for connection to said fluid source, an outlet, valve means at the inlet permitting a low flow rate therethrough, a pilot-operated diaphragm valve at the outlet, an accumulator for storing a measured quantity of incoming fluid and for discharging to said outlet upon opening of said diaphragm valve, and means for simultaneously opening said diaphragm valve and closing said valve means, whereby a measured quantity of fluid is quickly discharged through the outlet.

4. In a fluid control device having an inlet for connection to a pressurized fluid source and an outlet for connection to a fluid container, a flexible orificed member at the inlet providing a low flow rate to the device and defining a flow control valve, the outlet end of said orifice defining a shut-off seat, a pilot-operated diaphragm having one side in direct communication with the incoming fluid leaving said orificed member, an annular valve seat in communication with said outlet, the other side of said diaphragm defining a valve face for coaction with said annular valve seat to define a quick dump valve, an accumulator, a bleed hole in said diaphragm outside of said valve face intercommunicating said accumulator and inlet, and means for simultaneously opening said quick dump valve to intercommunicate the accumulator and outlet and to coact with said shut-off seat and close said flow control valve.

5. In a fluid control device having an inlet for connection to a pressurized fluid source and an outlet for connection to a fluid container, an elastic member supported at the inlet having an orifice therein and defining a flow control valve, said elastic member being responsive to the pressurized fluid to provide a substantially constant low flow rate and the outlet of said orifice defining a shut-off valve seat, a tubular member extending from said control valve and being enlarged and flanged at the free end, a solenoid actuated plunger slidable in said tubular member and having a protuberance of conical shape at the end adjacent said control valve defining a valve face for coaction with said shut-off valve seat to define a shut-off portion on said control valve, a pilot-operated flexible diaphragm extending across the flanged end of said tubular member, a housing having an inlet-outlet port and a discharge port, said housing including an opening in communication with said discharge port, an annular channel concentric to said opening in communication with said inlet-outlet port and defining an annular valve seat, said flanged tubular member being secured to said housing over said opening and channel so that a central portion of said diaphragm coacts with said annular valve seat to define a valve between the inlet-outlet port and the discharge port, a bleed hole in said diaphragm intercommunicating said channel and flared end of the tubular member, a central aperture through said diaphragm intercommunicating said discharge port and the flared end of said tubular member, a second protuberance of conical shape on said plunger at the end adjacent the diaphragm for coaction with said diaphragm central aperture, and an accumulator connected to said inlet-outlet port, said plunger being normally biased to open the shut-off valve and close the diaphragm central aperture and being operable to close the shut-off valve and open the central aperture.

6. A fluid control device for delivering a measured amount of fluid to a container, said device having an inlet connected to a pressurized fluid source and an outlet, a combination flow control and shut-off valve at the inlet for maintaining the incoming fluid flow at a substantially constant rate and for selectively stopping the incoming fluid flow, a pilot-operated diaphragm ahead of said outlet, a tubular member intercommunicating said valve and diaphragm, an accumulator for storing a measured amount of fluid under pressure, a bleed hole in said diaphragm intercommunicating said inlet and accumulator, a passageway directly connecting the outlet and accumulator interrupted by said diaphragm, and a solenoid actuated plunger for moving said diaphragm and closing said shut-off valve.

7. A three-way valve assembly for delivering a measured quantity of fluid to a container, said assembly including an inlet for connection to a pressurized fluid source, an outlet, an accumulator, a combination flow control and shut-off valve at the inlet, a tubular member connected at one end for communication with the outlet end of said combination valve and having a bell-shaped cap at the other end, a plunger slidable in said member having a projection at the end adjacent said combination valve for coaction therewith, a solenoid for actuating said plunger, a pilot-operated diaphragm across the open end of said cap, an annular seat underlying said diaphragm and in communication with said first mentioned outlet, an annular passageway concentric to said annular seat and in communication with said accumulator, a pilot carried on the end of the plunger opposite the projection carrying end for coacting with said diaphragm, and a bleed hole in said diaphragm intercommunicating the inlet and accumulator, whereby energization of said solenoid slides said plunger within the tubular member to effect opening of said diaphragm and closing of said combination valve.

8. A three-way valve assembly for delivering a measured quantity of fluid to a container, said assembly including an inlet for connection to a pressurized fluid source, an outlet, an accumulator, a combination flow control and shut-off valve at the inlet, including an elastic disk having an orifice therein, a tubular member connected at one end for communication with the outlet end of said combination valve and having a bell-shaped cap at the other end, a plunger slidable in said member having a projection at the end adjacent said combination valve for coaction with the outlet end of said disk orifice, a solenoid for actuating said plunger, a pilot-operated diaphragm valve including a diaphragm extending across the open end of said cap, said diaphragm having a pilot opening centrally located therein, an annular seat underlying said diaphragm and in communication with said first mentioned outlet, an annular passageway concentric to said annular seat and in communication with said accumulator, a pilot carried on the end of the plunger opposite the projection carrying end for coacting with said diaphragm pilot opening, and a bleed hole in said diaphragm intercommunicating the inlet and accumulator, whereby energization of said solenoid slides said plunger in the tubular member to effect opening of said diaphragm and closing of said combination valve.

9. A three-way valve assembly for delivering a measured quantity of liquid to a container said assembly including an inlet adapted to be connected to a pressurized liquid supply, means for storing under pressure a measured quantity of liquid, an outlet, means at the inlet for providing a substantially constant low rate flow of the incoming liquid, the outlet end of said constant flow means being in communication with said storing means, a passageway between said storing means and said first mentioned outlet, valve means in said passageway selectively operable to interconnect said storing means and said first mentioned outlet when said valve means is open and affording communication between said inlet and said storing means when said valve means is closed, and means for selectively actuating said valve means.

10. A three-way valve assembly for delivering a measured quantity of liquid to a container said assembly including an inlet adapted to be connected to a pressurized liquid supply, means for storing under pressure a measured quantity of liquid, an outlet, means at the inlet for providing a substantially constant low rate flow of the incoming liquid, the outlet end of said constant flow means being in communication with said storing means, a passageway between said storing means and said first mentioned outlet, valve means in said passageway selectively operable to interconnect said storing means and said first mentioned outlet when said valve means is open and affording communication between said inlet and said storing means when said valve means is closed, shut-off means at said inlet for selectively stopping the incoming flow of liquid, and means for substantially simultaneously opening said valve means and closing said shut-off means, whereby the storing means unloads the measured quantity of liquid through said first mentioned outlet.

References Cited in the file of this patent

UNITED STATES PATENTS 1,454,765     Patterson et al.  ---------- May 8, 1923